Figure 1:
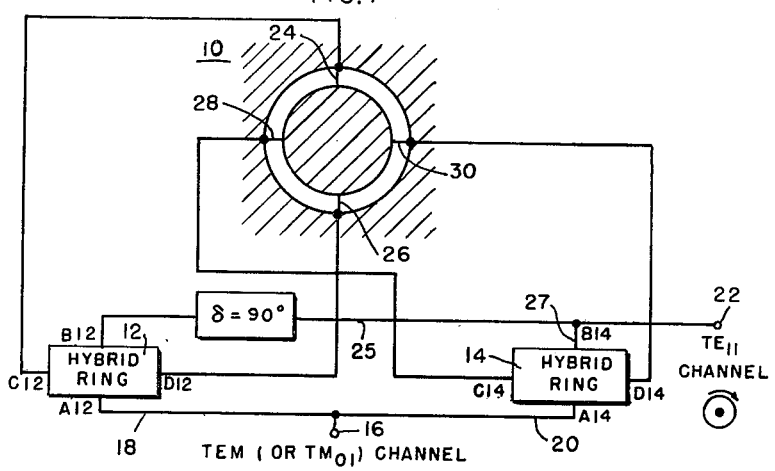

Jan. 12, 1965

L. HATKIN 3,165,743

AMPLITUDE/PHASE MONOPULSE ANTENNA SYSTEM

Filed Jan. 11, 1963

INVENTOR,
LEONARD HATKIN

BY
Harry M. Saragovitz
ATTORNEY.

United States Patent Office 3,165,743
Patented Jan. 12, 1965

3,165,743
AMPLITUDE/PHASE MONOPULSE ANTENNA SYSTEM
Leonard Hatkin, Elberon, N.J., assignor to the United States of America as represented by the Secretary of the Army
Filed Jan. 11, 1963, Ser. No. 250,961
3 Claims. (Cl. 343—100)
(Granted under Title 35, U.S. Code (1952), sec. 266)

The invention described herein may be manufactured and used by or for the Government for governmental purposes without the payment of any royalty thereon.

This invention relates to target locating systems and more particularly to an antenna system adapted to provide azimuth and elevation data on a monopulse basis.

In conventional monopulse systems, angular information is obtained from a single radiated energy pulse by using at least two antennas or antenna apertures. Since the accuracy of such tracking systems requires a relatively narrow beam, the antennas are relatively large and heavy. Consequently, such monopulse antennas are not suitable for use in systems where weight and size are limiting factors, as, for example, in earth satellites which will locate the source of lightning discharges or "sferics" in the earth's atmosphere.

It is therefore an object of the present invention to provide a simple, compact, lightweight antenna system for deriving both azimuth and elevation data on a monopulse basis.

It is another object of the present invention to provide a simple antenna system wherein a split beam pattern and a broad symmetrical pattern are produced simultaneously to permit amplitude/phase monopulse operation.

In the following description, the coaxial TEM mode and the cylindrical waveguide $TM_{01}$ mode are assumed to be equivalent field configurations insofar as this application is concerned. To indicate this, the term $TM_{01}$ will be parenthesized.

Briefly, the present invention comprises an antenna system including means for simultaneously producing two radiation patterns having field configurations such that the azimuth amplitude response in each mode is uniform and which are further characterized in that the difference in phase between the two patterns is directly proportional to the azimuth angle of a target and the difference in the amplitude of the two patterns is proportional to the elevation angle of the target.

In accordance with one embodiment of the present invention, there is provided an antenna system adapted for amplitude/phase monopulse operation. Included is an annular slot antenna, and a radio-frequency energy source having field configurations of either the coaxial TEM or, in cylindrical waveguide, the equivalent $TM_{01}$ mode, and a $TE_{11}$ linear mode. Also included are means for circularly polarizing the $TE_{11}$ linear mode and a first and second pair of quadrature aligned probes in coupling relationship with the annular slot antenna and respectively energized by the TEM (or $TM_{01}$) mode, and the circular polarized $TE_{11}$ mode. By this arrangement, there is established a radiation pattern in free space characterized by simultaneous field configurations of either the TEM mode (or $TM_{01}$) mode, and the $TE_{11}$ circular polarized mode.

Figure 2:
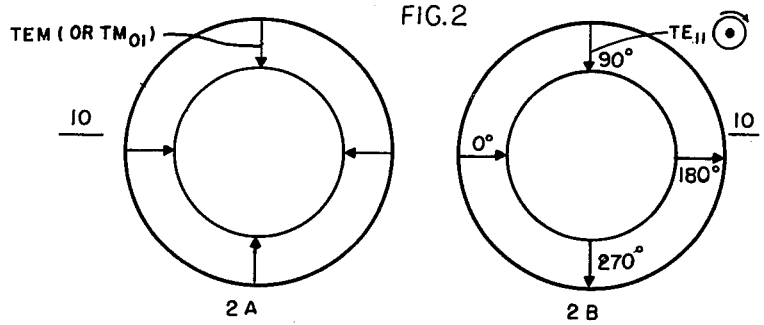
Figure 3:
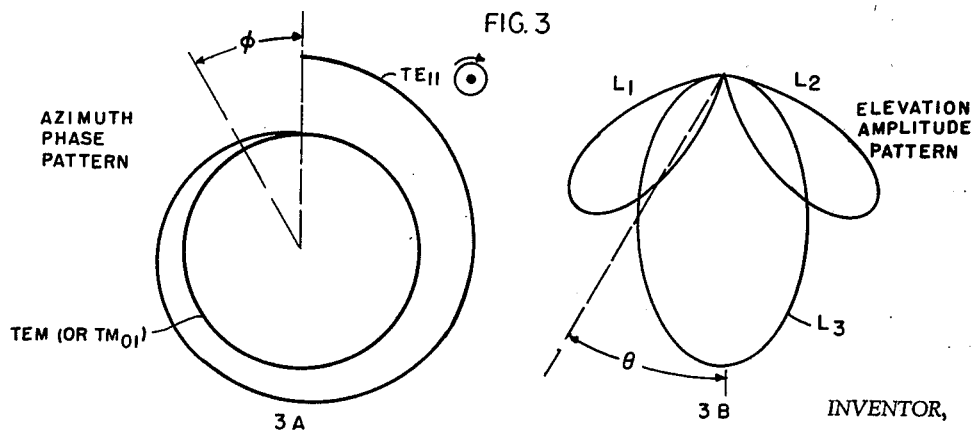

For a better understanding of the invention, together with other and further objects thereof, reference is had to the following description taken in connection with the accompanying drawing in which:

FIG. 1 is a schematic diagram of the antenna system;
FIG. 2 is an illustrative diagram showing the simultaneous modes at the annular slot antenna;
FIG. 3 is an illustrative diagram of the free space radiation pattern at the annular slot antenna;

Referring now to FIG. 1 of the drawing, at 10 there is shown an annular slot antenna which may be mounted parallel to the ground. Slot antenna 10 is simultaneously energized by two independent feed networks which establish respective field configurations of the TEM mode (or $TM_{01}$ mode) and the $TE_{11}$ mode with the latter circularly polarized. The two feed networks comprise discrete ring hybrid circuits 12 and 14. Such ring hybrid circuits are well known in the art and no further description thereof is believed necessary. The similar input and output ports of hybrid rings 12 and 14 are identified by like letters. Thus $A_{12}$ and $A_{14}$, and $B_{12}$ and $B_{14}$, are the corresponding input ports of the ring hybrids 12 and 14 and $C_{12}$ and $C_{14}$, and $D_{12}$ and $D_{14}$ are the corresponding output ports of ring hybrids 12 and 14. The input ports $A_{12}$ and $A_{14}$ are fed from a common terminal 16 through equal path lengths 18 and 20. The input ports $B_{12}$ and $B_{14}$, however, are fed from a common terminal 22 through path lengths 25 and 27 which differ by $\frac{1}{4} \lambda$ or 90°, so that the R-F energy at the input ports $B_{12}$ and $B_{14}$ will differ in phase by 90°. Energy is fed to slot antenna 10 by means of two pairs of probes which are orthogonally arranged. As shown, the probes 24 and 26 comprising one probe pair are diametrically opposed, and the probes 28 and 30, which comprise the other probe pair, are aligned in quadrature with respect to probe pair 24 and 26. Probe pair 24 and 26 and probe pair 28 and 30 are connected through equal path lengths to output ports $C_{12}$ and $D_{12}$, and to output ports $C_{14}$ and $D_{14}$, respectively. It is to be understood, of course, that other well known coupling means may be used to feed the annular slot antenna 10.

In operation, each mode excitable in the antenna defines a radiation reception pattern in free space convergent at the slot antenna. The TEM (or $TM_{01}$) mode of the transmitter energy is applied to common terminal 16 and the $TE_{11}$ mode is applied to common terminal 22. With the feed arrangements hereinabove described, annular slot antenna 10 will be energized in both the linear TEM (or $TM_{01}$) mode and the circular polarized $TE_{11}$ mode. The electric field configurations of the linear TEM (or $TM_{01}$) mode and the $TE_{11}$ mode existing at the annular slot antenna are shown in FIGS. 2A and 2B, respectively. Each mode is similarly polarized but with differing phase and amplitude patterns. As shown in FIG. 3A, the linear polarized TEM (or $TM_{01}$) mode will have a constant phase characteristic with respect to variations in azimuth angle $\phi$ while the circular polarized $TE_{11}$ mode will exhibit a spiral phase characteristic. Thus the pattern at the annular slot antenna 10 is such that the phase of the TEM (or $TM_{01}$) mode is uniform in azimuth, while that of the $TE_{11}$ mode varies linearly with the azimuth angle due to the fact that the mode is circularly polarized. The amplitude pattern of the annular slot antenna 10 is shown in FIG. 3B. Lobes $L_1$ and $L_2$ represent the difference pattern at the annular slot antenna 10 resulting from the linear TEM (or $TM_{01}$) mode and lobe $L_3$ represents the sum pattern of the annular slot antenna 10 resulting from the circularly polarized $TE_{11}$ mode. It is to be understood that the azimuth amplitude response in each mode is uniform so that, in azimuth, the amplitude of the signal does not vary in either mode. Assuming now that for received signals the output of the two modes at terminals 16 and 22 are fed to separate receivers, it can be seen from FIGS. 3A and 3B that a comparison of the relative phase between the two resulting signals would yield the azimuth angle $\phi$ of the target, and elevation angle $\theta$ of the target would be obtained by comparing the relative signal amplitudes between the circularly polarized element of the beam pattern lobe $L_3$ and one of the linearly polarized elements, lobe $L_1$ or $L_2$. The actual reading of the elevation angle $\theta$ may be obtained from a previously derived calibration curve of relative amplitude vs. elevation angle. Although the above system is described in connection with an annular slot antenna, it is to be understood that the invention is not to be limited thereto. For example, the two patterns described above having the same azimuth and phase characteristics can be achieved by utilizing an Archimedian two-wire spiral antenna such as described in I.R.E. Transactions on Antenna and Propagation, May 1960, pages 312–322. In this system, the feed networks are not required and hence can be eliminated. The terminals of the two-wire spiral antenna are energized in the usual manner as indicated in the above noted publication. At a circumference on the spiral antenna equal to one $\lambda$ of the operating frequency, a circular polarized sum pattern similar to lobe $L_3$ of FIG. 3B will be radiated. Also, at a circumference $2\lambda$ on the spiral antenna, a difference pattern similar to lobes $L_1$ and $L_2$ is radiated. This latter pattern is also circularly polarized and is rotating at twice the speed of the sum pattern. Hence, for every 360° phase rotation of the sum pattern, the difference pattern has rotated through 720°. Thus, in effect, the same type of pattern is achieved as that described in connection with the annular slot antenna 10. That is, the difference in phase between the two circular polarized patterns is directly proportional to the azimuth angle as described in connection with the annular slot antenna. Thus, as in the annular slot antenna, a comparison of the relative phase between the two resulting signals will provide the azimuth angle $\phi$ and a comparison of the relative signal amplitude between the beam patterns will provide the elevation angle $\theta$.

It is to be understood of course, that antennas of the type described may be used to feed reflectors, or lenses, etc., to form a narrow beam operating in the amplitude/phase monopulse mode.

While there has been described what is at present considered to be the preferred embodiment of this invention, it will be obvious to those skilled in the art that various changes and modifications may be made therein without departing from the invention, and it is therefore aimed in the appended claims to cover all such changes and modifications as fall within the true spirit and scope of the invention.

What is claimed is:

1. An antenna system for amplitude/phase monopulse operation comprising, an annular slot antenna, and means including two discrete channels for energizing said annular slot antenna to establish a radiation pattern in free space characterized by simultaneous field configurations of either the TEM mode or $TM_{01}$ mode, and the $TE_{11}$ circular polarized mode, said radiation patterns being further characterized such that the difference in phase between the channel mode patterns is an indication of the azimuth of a target, and the difference in amplitude between the channel mode patterns is an indication of the elevation angle of the target, and the azimuth amplitude response in each mode is uniform.

2. An antenna system for amplitude/phase monopulse operation comprising, an annular slot antenna, a first and second pair of quadrature aligned probes in coupling relationship with said annular slot antenna, a microwave energy source having field configurations of either the TEM mode or $TM_{01}$ mode, and a $TE_{11}$ linear mode, a first and second ring hybrid circuit, each having two input terminals and two output terminals, each of said first pair of probes being connected to respective output terminals of one of said ring hybrid circuits, each of said second pair of probes being connected to respective output terminals of the other of the ring hybrid circuits, said $TE_{11}$ linear mode being applied simultaneously to discrete and corresponding input terminals of said first and second ring hybrid circuits through respective transmission lines differing in length by 90°, and said TEM, or $TM_{01}$ mode, being applied simultaneously through respective equal lengths transmission lines to the remaining discrete and corresponding input terminals of said first and second ring hybrid circuit.

3. In an antenna system including an annular slot antenna, means including two discrete channels for energizing said slot antenna to simultaneously establish two radiation patterns in free space such that the difference in phase between the channel mode patterns is an indication of the azimuth of a target and the difference in amplitude between the channel mode patterns is an indication of the elevation angle of the target, the two patterns being further characterized in that the azimuth amplitude response in each mode is uniform, said means comprising, a first and second pair of quadrature aligned probes in coupling relationship with said annular slot antenna, a radio-frequency source having field configurations of either the TEM mode or $TM_{01}$ mode, and a $TE_{11}$ linear mode, means for circularly polarizing said $TE_{11}$ linear mode, and means for simultaneously energizing respective pairs of probes by said TEM, or $TM_{01}$ mode, and said circular polarized $TE_{11}$ mode.

References Cited by the Examiner

I.R.E. National Convention Record, 1958 (vol. 6, part 1), pages 177–182 relied on.

CHESTER L. JUSTUS, *Primary Examiner*.

KATHLEEN CLAFFY, *Examiner*.